Figure 1:
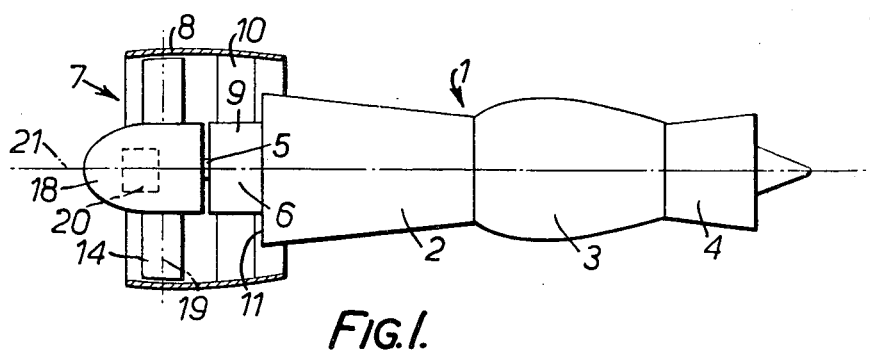

United States Patent [19]

Poucher et al.

[11] 3,918,837

[45] Nov. 11, 1975

[54] BLADED ROTORS

[75] Inventors: Michael Poucher, Cheltenham; Ivor Harold Brooking, Gloucester, both of England

[73] Assignee: Dowty Rotol Limited, Gloucester, England

[22] Filed: Feb. 15, 1974

[21] Appl. No.: 443,145

[30] Foreign Application Priority Data
Feb. 17, 1973 United Kingdom................ 7888/73

[52] U.S. Cl.................................. 416/157; 416/48
[51] Int. Cl.² ........................................ B64C 11/40
[58] Field of Search ....... 416/48, 49, 151, 153, 154, 416/157, 157 A

[56] References Cited
UNITED STATES PATENTS

| | | | |
|---|---|---|---|
| 2,592,124 | 4/1952 | Diefenderfer..................... | 416/48 X |
| 2,664,960 | 1/1954 | Longfellow et al............... | 416/48 X |
| 2,830,668 | 4/1958 | Gaubis et al....................... | 416/157 |
| 2,910,126 | 10/1959 | Jedrziewski......................... | 416/157 |
| 3,003,566 | 10/1961 | Conn et al. ....................... | 416/49 X |
| 3,163,233 | 12/1964 | Lambeck .......................... | 416/48 X |
| 3,459,267 | 8/1969 | Chilman............................. | 416/157 |

Primary Examiner—Everette A. Powell, Jr.
Attorney, Agent, or Firm—Young & Thompson

[57] ABSTRACT

A bladed rotor including a liquid-pressure-operable actuator for adjusting the blades of the rotor to vary flow of fluid over the blades, a positional control valve assembly and a condition control valve assembly, operable the one in conjunction with the other, and respective input linkages for adjusting said valve assemblies for control of the actuator. The actuator is connectible to receive, by way of said valve assemblies, liquid delivered by a pump or pumps associated with the rotor. The condition control valve assembly includes two co-operable elements, one of which is continuously rotatable with respect to the other upon rotor rotation.

15 Claims, 4 Drawing Figures

BLADED ROTORS

This invention relates to bladed rotors.

According to the invention a bladed rotor includes a liquid pressure-operable actuator for adjusting the blades of the rotor to vary flow of fluid over the blades, a positional control valve assembly and a condition control valve assembly, operable the one in conjunction with the other, and respective input linkages for adjusting said valve assemblies for control of the actuator, said actuator being connectible to receive, by way of said valve assemblies, liquid delivered by a pump or pumps associated with the rotor, and said condition control valve assembly including two co-operable elements, one of which is continuously rotatable with respect to the other upon rotor rotation.

The positional control valve assembly may also include two co-operable elements one of which is continuously rotatable with respect to the other upon rotor rotation. The two elements of each said valve assembly may comprise a spool and a sleeve, the sleeve forming the continuously rotatable element of its assembly.

The rotor may be of self-contained form in that its hub carries said control valve assemblies and said pump or pumps so that they are rotatable therewith, said pump or pumps being operable upon rotation of the rotor.

Mechanical means may connect said pump or pumps with non-rotative structure external of the rotor to afford their operation upon rotation of the rotor. The said mechanical means may include a shaft whose axis is coincident with the rotational axis of the rotor, one end portion of said shaft being held fast with respect to said non-rotative structure, and the other end portion thereof having associated gearing by way of which the pump or pumps are driven upon rotation of the rotor. Both of said sleeves may include gearing by which they are driven from said associated gearing to afford their continuous rotation upon rotation of the rotor.

The said positional control valve assembly and the said condition control valve assembly may be disposed radially of and within the hub. The said respective input linkages may include tubes axially-slidable with respect to said hub, said tubes having their axes coincident with said rotational axis and being connected respectively to the spools of their associated assemblies so that axial adjustment of the tubes effects linear movement of the spools with respect to the sleeves. The tubes may be connected to their spools by way of respective cam and roller mechanisms.

The tubes may be axially-slidable respectively by means of a rotary positional input member and a rotary condition input member mounted upon non-rotative structure external of the rotor, the engagement of the input members with their respective tubes being such as to afford the required range of axial adjustment of the tubes.

Preferably the hub includes at least one further pump separate from said pump or pumps and intended for feathering and unfeathering of the blades when the spool of the condition control valve assembly is displaced to appropriate positions.

The said pump or pumps may draw their liquid for operation from an associated main reservoir contained within the hub, while said further pump draws its liquid for operation from an auxiliary reservoir which is separate from but adjacent to said main reservoir.

Where the rotor has two pumps, a liquid-pressure-operable pump control valve may be provided in association with one of those two pumps and may be adapted to direct supply from that pump to the actuator only when said positional control valve assembly is opened beyond a predetermined position. In this case the other of said two pumps may have low flow characteristics suitable for adjustment of the blades of the rotor at slow rates, and said one pump may have high flow characteristics, the supply from said one pump when directed to the actuator supplementing the supply to the actuator from said other of said two pumps to afford adjustment of the blades at fast rates.

Also according to the invention there is provided a bladed rotor having two pumps associated therewith which are operable to supply a liquid-pressure-operable actuator by way of control valve means for adjusting the blades of the rotor to vary flow of fluid over the blades, and a liquid-pressure-operable pump control valve associated with one of said pumps and adapted to cause all of the liquid supplied by said one pump to pass to said actuator only when said control valve means is opened beyond a predetermined position.

Figure 2A:
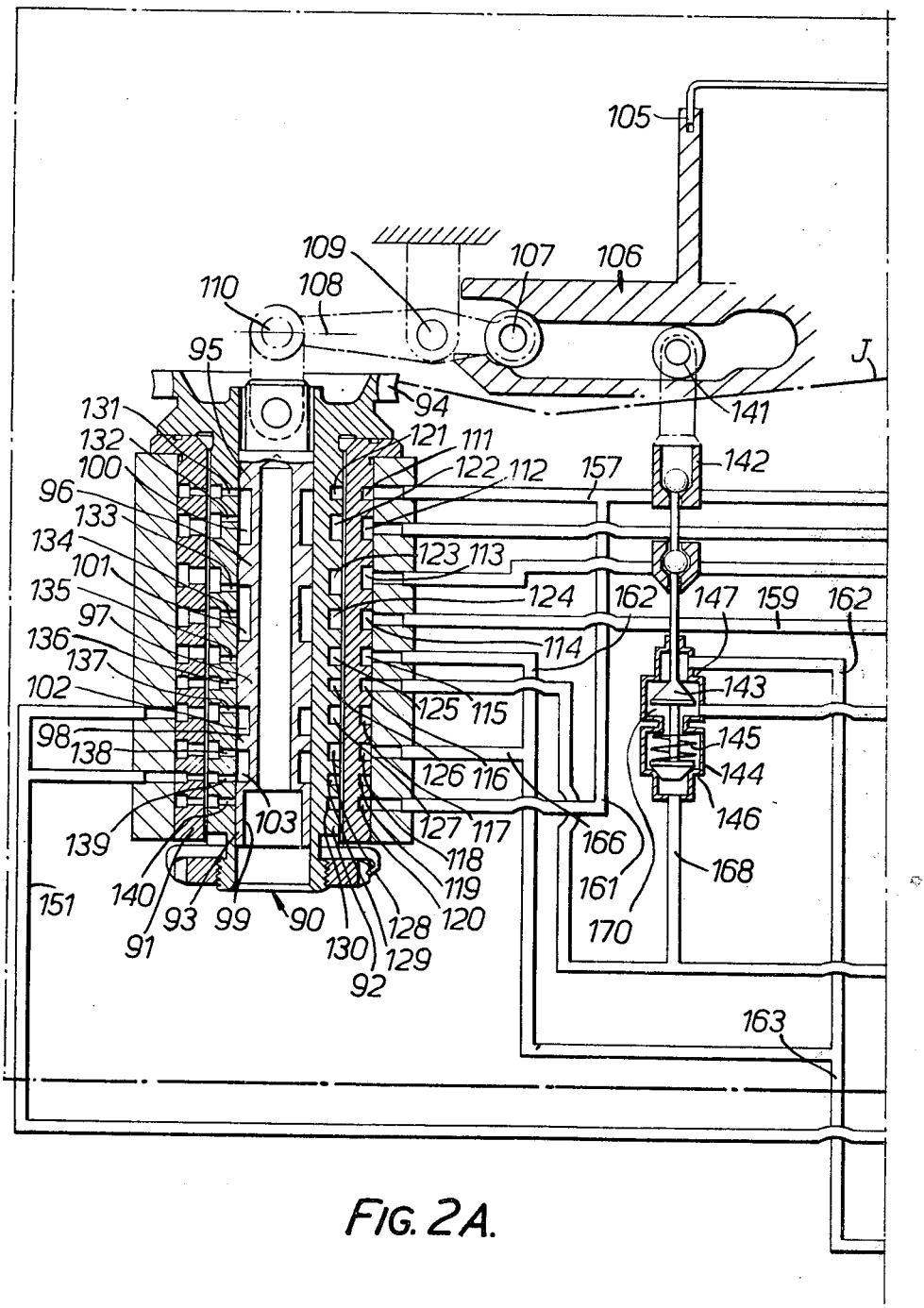
Figure 2B:
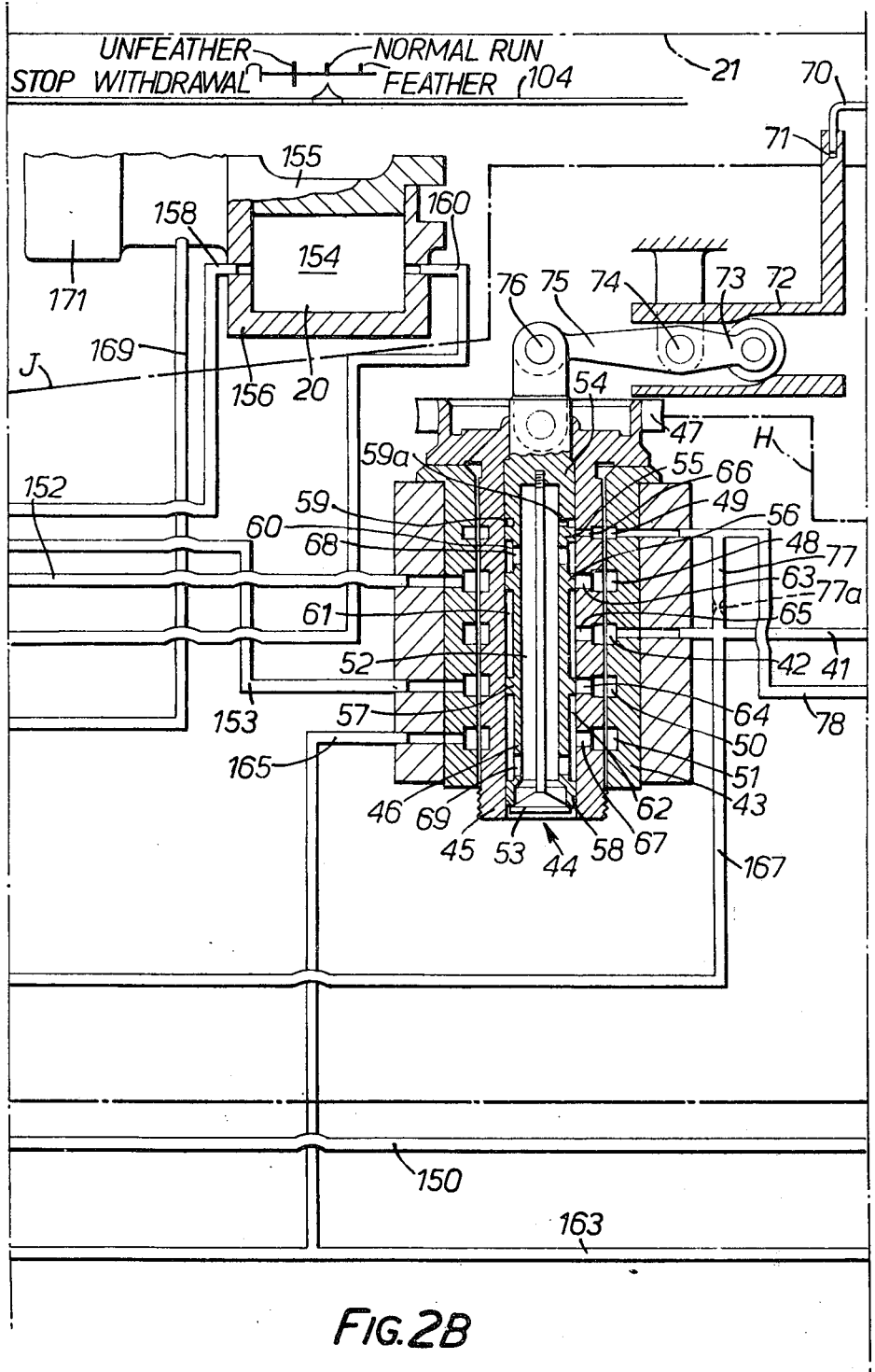
Figure 2C:
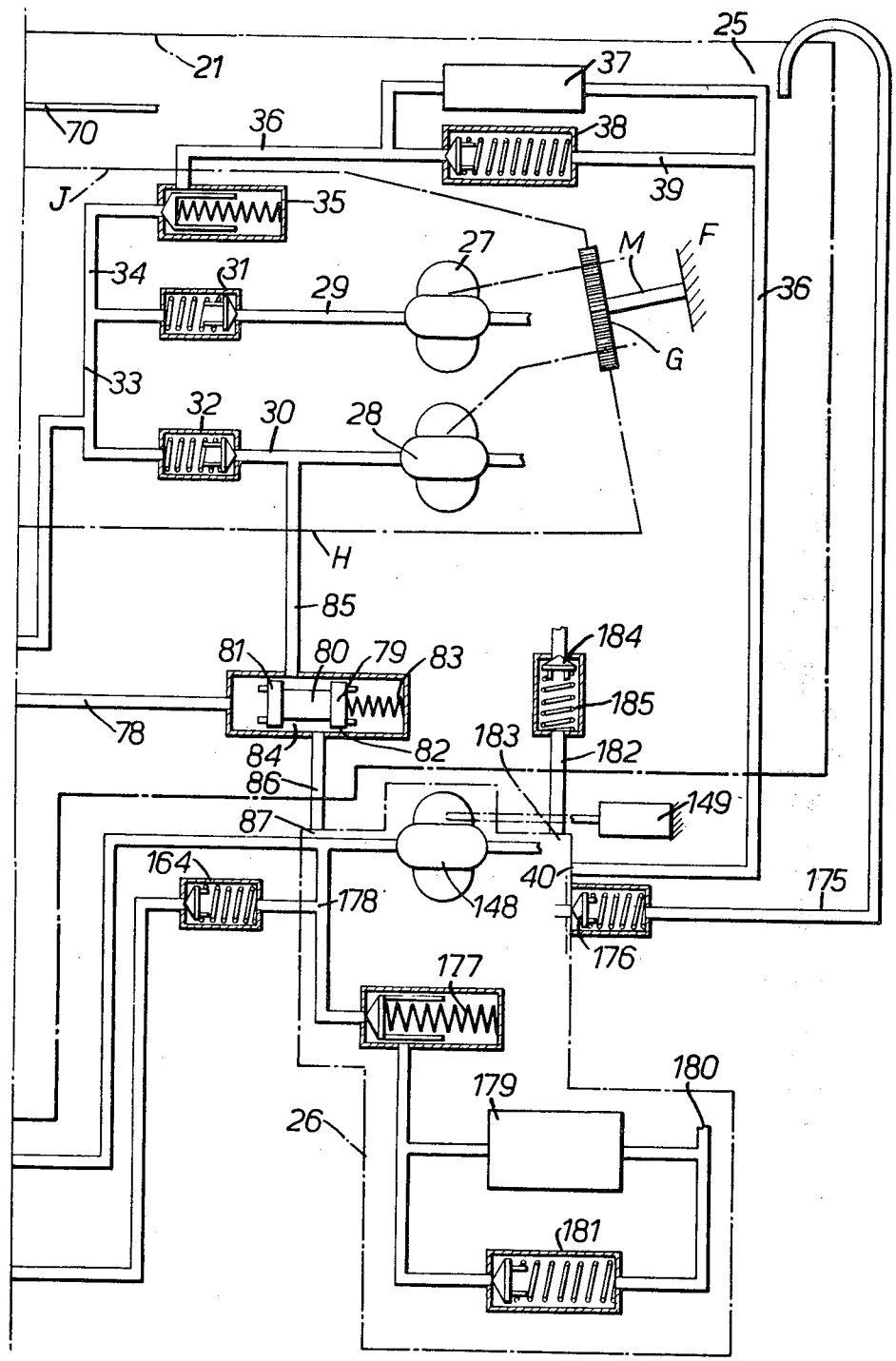

One embodiment of the invention will now be particularly described by way of example with reference to the accompanying drawings, of which, FIG. 1 is a diagrammatic side elevation, partly in cross-section, of an aircraft gas turbine engine of the by-pass type having a ducted-fan, and, FIG. 2, comprising parts A, B and C, diagrammatically shows an hydraulic control circuit associated with the fan of the engine shown in FIG. 1.

Referring to FIG. 1 of the drawings a gas turbine engine 1 comprises a compressor 2, a combustion section 3 and a turbine section 4. An output shaft 5 taken from a reduction gear 6 of the engine 1 carries a fan 7 which is rotatable within a by-pass duct 8 itself mounted upon the engine casing 9 by means of stator blades 10. The fan thus charges both the by-pass duct 8 and the inlet 11 of the compressor 2. The fan comprises a bladed rotor having fourteen blades 14 each mounted in bearings (not shown) in the hub 18 of the fan, these blades being variable in pitch about their longitudinal pitch-change axes 19 under the control of an hydraulically-operable balanced-vane-type actuator 20 housed within and rotatable with the hub 18.

The fan 7 is of self-contained form in that, as well as the hub thereof housing the actuator, it also houses in a manner so as to be rotatable therewith, an annular main reservoir, an annular feathering reservoir, two pumps for normal pitch-changing operation, a feathering pump, and control valve means which control the delivery of liquid from said pumps to said actuator.

The rotational axis of the actuator 20 is coincident with the rotational axis 21 of the fan.

Such a self-contained fan is disclosed in the specification of application Ser. No. 443,146 in the names of John Gregory Keenan, John Alfred Chilman and Ivor Harold Brooking.

With reference now to FIG. 2 of the drawings the annular main reservoir is diagrammatically shown at 25 while the annular feathering reservoir is shown diagrammatically at 26, the reservoir 26 surrounding the reservoir 25.

The hub 18 houses a gear pump 27 which has low flow characteristics, and a gear pump 28 which has high flow characteristics, both of these pumps drawing their liquid from the reservoir 25 when driven with rotation of the hub by way of gearing G and mechanical means M which connect to fixed structure F. Such mechanical means are disclosed in detail in the specification of the abovementioned Application.

The pumps 27 and 28 respectively deliver pressure fluid through conduits 29, 30 and non-return valves 31, 32 and feed into a common conduit 33. A conduit 34 branched from the conduit 33 incorporates a relief valve 35, and a drain conduit 36 taken from this relief valve incorporates a filter 37. A filter by-pass valve 38 is provided in a by-pass conduit 39 as shown. The drain conduit 36 connects with the reservoir 26 at 40.

A conduit 41 is taken from the conduit 33 to an annulus 42 formed in an outer sleeve 43 of a positional control valve assembly 44. This assembly forms part of the said control valve means and comprises the outer sleeve 43, an inner sleeve 45 and a landed spool 46 which is linearly displaceable within the sleeve 45. The sleeve 45 is provided at its upper end portion with gear teeth 47 by way of which, through suitable means indicated by the dotted line H, it is continuously driven from the gearing G upon rotation of the fan 7.

The outer sleeve 43 is provided with two further annuli 48 and 49 above the annulus 42 and two further annuli 50 and 51 below the annulus 42. The spool 46 is hollow, as at 52, and is plugged at 53 at its lower end portion. The spool is provided with lands 54, 55, 56, 57 and 58, annuli 59, 60, 61 and 62 being respectively formed between them.

The spool 46 is shown in FIG. 2 in its neutral position in which the lands 56 and 57 close ports 63 and 64 in the sleeve 45 which themselves respectively align with the annuli 48 and 50.

The annulus 42 opens through a port 65 in the sleeve 45 to the annulus 61 while the annulus 49 opens to a port 66 which with the spool 46 in the neutral position is blanked by the land 55. The annulus 51 opens through a port 67 in the sleeve 45 to the annulus 62. Ports 68 in the spool place the interior 52 thereof in communication with the annulus 60, while ports 69 in the spool place the interior thereof in communication with the annulus 62.

The spool 46 is displaceable linearly on either side of its neutral position by means of an input linkage from pilot's control (not shown) on fixed engine structure, said linkage including an input tube 70 whose axis is coincident with the rotational axis 21 of the fan and which connects through a translation bearing 71 with a cam device 72. The cam device 72 is co-operable with a roller and link assembly 73, pivoted at 74 to the hub structure. The link 75 of this assembly is, at its left-hand end 76 in the drawing, pivotally connected to the upper end portion of the spool 46. A conduit 77, having a restrictor 77a, is branched from the conduit 41 and taken to the annulus 49 while a further conduit 78 is branched from the conduit 77 and taken to a pump control valve 79 associated with the gear pump 28. This valve comprises a spool 80 which has two lands 81 and 82 and which is biassed to the left in the drawing by a coil spring 83. In its position shown in the drawing the annulus 84 formed between the two lands places a conduit 85 branched from the conduit 30 in communication with a conduit 86 which is itself connected at 87 to the reservoir 26.

As well as including the positional control valve assembly 44, the said control valve means includes a condition control valve assembly 90. The assembly 90 comprises an outer sleeve 91, an inner sleeve 92 and a landed spool 93 which is linearly displaceable within the sleeve 92. The upper end portion of the sleeve 92 is provided with gear teeth 94 by way of which the sleeve is, as with that of the assembly 44, continuously driven through suitable means indicated by the dotted line J from the gearing G upon rotation of the fan.

Both the assembly 44 and the assembly 90 are radially-disposed with respect to the axis 21 and are rotatable with the hub 18. In a manner not shown in FIG. 2 both assemblies are mounted upon the forwardly-facing end of the vane actuator and means are provided to counteract the effect of centrifugal force upon the spools of the assemblies.

The spool 93 is provided with five lands 95, 96, 97, 98 and 99, these lands respectively forming annuli 100, 101, 102 and 103 between them. The spool is linearly displaceable with respect to the rotatable sleeve 92 whereby it can assume any one of certain settings. These settings correspond to various modes of operation of the fan, namely "feather", "normal-run", "unfeather" and "pitch stop withdrawal".

The spool 93 is adjustable by means of control linkage which is operated by a pilot's condition control lever (not shown) mounted upon fixed structure, the linkage including a tube 104 whose axis is coincident with the axis 21 of rotation of the fan and which connects through a translation bearing 105 with a condition selection cam 106. The cam 106 is co-operable with a roller 107 mounted at the right-hand end portion of a link 108 itself pivotally mounted at 109 upon hub structure. The left-hand end portion of the link 108 is pivotally connected at 110 to the spool 93.

The outer sleeve 91 is provided in its outer surface with ten annuli, 111-120, while the exterior surface of the inner rotatable sleeve 92 is likewise provided with ten annuli, 121 – 130.

In the position shown in the drawing the spool 93 is in the "normal-run" setting for the fan.

Suitable ports provided in the outer sleeve 91 place the annuli 111-120 respectively in communication with the annuli 121 – 130 in the sleeve 92. With the spool 93 thus in its "normal-run" position, ports 131 and 132 in the sleeve 92 respectively place the annuli 121 and 122 in communication with the annulus 100. Also ports 133 and 134 in the sleeve 92 respectively place the annuli 123 and 124 in communication with the annulus 101. Ports 135 and 136 which open from the annuli 125 and 126 are blanked by the land 97. Port 137 places the annulus 127 in communication with the annulus 102. Ports 138 and 139 respectively place the annuli 128 and 129 in communication with the annulus 103. Also port 140 which opens from annulus 130 is blanked by the land 99.

Also associated with the cam 106 is a roller 141 which is connected by way of linkage 142 to the twin-poppet displaceable element 143 of a stop withdrawal valve 144. This element is normally urged by a coil spring 145 onto a seating 146, the upper poppet portion then being spaced away from its seating 147.

Housed within the reservoir 26 is a further gear pump 148 which is operable as a feathering pump.

This pump is driven upon normal running of the fan by mechanical means connected with fixed structure and in a manner later described the delivery therefrom is then by-passed to the reservoir 26. However, when the fan is running down towards the stopped condition and the pumps 27 and 28 are ineffective for pitch-change, the pump 148 can be driven by an electrical feathering motor 149 mounted upon fixed structure. Such an arrangement of feathering motor and feathering pump is disclosed in the above mentioned Specification of application Ser. No. 443,146. The delivery side of the feathering pump is connected by a conduit 150 to the annulus 119 of the assembly 90, while a conduit 151 branched from the conduit 150 connects to the annulus 117 of that assembly.

A fine pitch conduit 152 is taken from the annulus 48 of the assembly 44 to the annulus 113 of the assembly 90 while a coarse pitch conduit 153 is taken from the annulus 50 of the assembly 44 to the annulus 112 of the assembly 90.

The actuator 20 which is of annular form has a multiplicity of chambers 154, in this particular embodiment twelve, formed by a first multi-vaned actuator part 155, and a second multi-vaned actuator part 156. These parts drive the blades for pitch-change through bevel gearing (not shown). A bladed rotor having such an actuator is disclosed in the Specification of U.S. Pat. No. 3,664,763.

A conduit 157 is taken from the annulus 111 of the assembly 90 and connects through the porting 158 to all the coarse pitch chambers of the actuator 20, while a conduit 159 is taken from the annulus 114 of the assembly 90 and connects through porting 160 to all the fine pitch chambers of the actuator. A conduit 161 is branched from the conduit 157 and connects to the annulus 120 of the assembly 90.

A return conduit 162 is taken from the annulus 115 of the assembly 90 to the upper end portion of the valve 144 while a further conduit 163 is branched from the conduit 162 and taken through a non-return valve 164 to the reservoir 26. A return conduit 165 is taken from the annulus 51 of the assembly 44 and connects into the conduit 163. A short conduit 166 is taken from the annulus 118 of the assembly 90 and connects into the conduit 162.

A conduit 167 is branched from the conduit 41 and taken to the annulus 116 of the assembly 90, a branch conduit 168 being taken from the conduit 167 to the lower end portion of the valve 144.

A conduit 169 is taken from the chamber 170 formed between the seatings 146 and 147 of the valve 144 to a fine pitch stop withdrawal mechanism, diagrammatically shown at 171, associated with the vane-type actuator 20.

A conduit 175 is taken from the reservoir 26 to the open side of the reservoir 25 and at the junction of this conduit with the reservoir 26 a relief valve 176 is provided which only opens to permit liquid to pass from the reservoir 26 into the conduit 175 when the reservoir 26 is hydraulically full.

Contained within the reservoir 26 is a feathering pump relief valve 177 disposed in a conduit 178 branched from a position on the downstream side of the pump 148 and taken through a filter 179 to discharge opening 180. A filter by-pass valve 181 is provided in parallel with the filter 179.

A conduit 182 is taken from a port 183 in the wall of the reservoir 26 and extends into the interior of the reservoir 25 where it incorporates a valve 184 whch is openable against a spring 185 under centrifugal force during rotation of the fan. This conduit and valve also constitute means for automatically topping-up the reservoir 26, should any cavitation occur therein, from the reservoir 25. Further, this valve closes onto its seating under the effort of its spring when the fan ceases to rotate and, in this way, prevents the flow of liquid from the reservoir 26 into the reservoir 25.

During normal running operation of the fan and gas turbine engine, for example, for cruise operation of the aircraft in which they are installed, the pilot's condition control lever (not shown) is positioned so that the tube 104 sets the spool 93 of the assembly 90 in the "normal-run" position by way of the cam 106 and link 108, the spool 93 being thus in the position shown in FIG. 2. At the same time, when the fan is running at an "on-speed" condition required by the pilot's control lever associated with the positional control valve assembly 44, the spool 46 thereof is in its neutral position as shown.

During rotation of the fan 7 powered by the engine, the rotors of the three gear pumps, 27, 28 and 148 are driven through their respective mechanical means associated with the fixed structure. The pump 27 draws liquid from the reservoir 25 and delivers this through the non-return valve 31 into the conduit 33, and then through the conduit 41, conduit 77 and conduit 78 into the pump control valve 79 to hold the spool 80 in the position shown in FIG. 2. Thus liquid drawn in from the reservoir 25 and pumped by the pump 28 through the conduits 30 and 85 passes directly to the conduit 86 and port 87 into the reservoir 26. Hence the pump 28 is completely unloaded whilst since the spool 46 is in its neutral position, the delivery from the pump 27 passes through the conduit 34, the relief valve 35, the conduit 36 and the filter 37 to the port 40 and thus to the reservoir 26.

The pump 148 simultaneously draws liquid from the reservoir 26 and delivers this through the conduit 150 to the annulus 119 of the condition control valve assembly 90 and thence through the port 139, annulus 103, port 138 and annulus 128 to the conduit 166. From there this liquid passes to the reservoir 26 by way of the conduits 162 and 163 and non-return valve 164. In this way the pump 148 also is completely unloaded.

If the pilot wishes to increase the rotational speed of the fan 7 he will operate his positional control lever (not shown) to displace the tube 70 to the right in FIG. 2, that is, in the direction requiring pitch-fining of the blades of the fan. Consequently, through the translation bearing 71 between fixed and rotating structure, the cam 72 is also moved to the right, causing the link 75 to move in a clockwise direction about its pivot 74, thereby displacing the spool 46 of the assembly 44 upwardly. Hence liquid pumped by the pump 27 and available in the conduit 41, the annulus 42, the port 65 and the annulus 61, passes through the port 63 and the annulus 48 into the fine pitch conduit 152. This liquid passes thence into the annulus 113 of the condition control valve assembly 90, whereupon it passes into the annulus 123 and through porting 133. Since the spool 93 is in its "normal-run" position, this liquid passes into the annulus 101, out through the port 134 and thence through the annulus 124 into the annulus 114. The liquid passes therefrom into the conduit 159 and then through the porting 160 into all the fine pitch chambers of the actuator 20. Simultaneously all the coarse pitch chambers of the actuator are placed in communication with the conduit 153 by way of the annulus 111, annulus 121, port 131, annulus 100, port 132, annulus 122 and annulus 112. Hence liquid from the coarse pitch chambers passes to the annulus 50 of the assembly 44 and then through the port 64, annulus 62, port 67, annulus 51, conduit 165, conduit 163 and non-return valve 164 to the reservoir 26.

In consequence the actuator 20 operates in the sense to drive the blades 14 of the fan 7 in the pitch-fining direction.

The positional control valve assembly 44 is so mounted with respect to the actuator 20 that upon such operation thereof follow-up movement occurs, tending to cause the link 75 to move the spool 46 back to its neutral position with respect to the sleeve 45 when the degree of pitch-change required by the movement of the tube 70 has been attained. The dimensions of the porting of the sleeve and of the lands of the spool are such that, provided the pilot does not, by his input movement, demand a pitch-change movement which at any instant produces a lag in the follow-up effect which is equivalent to more than 2½° blade angle, the valve 79 remains in the position shown in FIG. 2 and positional control of the actuator occurs solely under the power of the pump 27.

If, however, the pilot's signal is such as to demand a pitch-change which does produce a lag in the follow-up effect which is equivalent to more than 2½° blade angle, the effect is for the spool to have such movement as to open the port 66 in the sleeve 45 to the annulus 60. Since the port 68 is open to the interior 52 of the spool the conduit 77 is thus placed in communication with the return conduit 165. Hence the pressure on the downstream side, that is the upper side in FIG. 2 of the restrictor 77a, drops. Since this pressure drop is effective in the conduit 78, the coil spring 83 displaces the spool 80 of the pump control valve 89 to the left in the drawing. Thus the land 82 closes over the lower end of the conduit 85 and the delivery from the pump 28 no longer by-passes to the reservoir 26. Instead it passes through the non-return valve 32 into the conduits 33 and 41 to combine with the flow from the smaller flow gear pump 27. The increased combined flow is thus directed by the positional control valve assembly 44 and the condition control valve assembly 90 to the actuator 20, to produce the required higher rate of pitch-change of the blades 14.

If the pilot subsequently, during such pitch-fining selection, reduces the rate of movement of his control lever, the follow-up effect is such that the port 66 is closed by the land 55 of the spool 46, whereupon the pressure is re-established in the conduit 78 to re-open the pump control valve 79 and cause the discharge flow from the pump 28 to again pass to the reservoir 26.

If, instead of requiring the blading to be moved in the pitch-fining direction, the pilot requires it to be moved in the pitch-coarsening direction, he moves his positional control lever in the opposite direction, but maintains the condition control lever in its "normal-run" position. Hence the spool 46 of the assembly 44 is displaced downwardly in FIG. 2 and in a manner conversely to the flows for pitch-fining, all the coarse pitch chambers of the actuator 20 are supplied with liquid under pressure while the fine pitch chambers are placed in communication with the feathering reservoir 26. If, as with the pitch-fining operation, the pilot demands fast rates of pitch-change, he moves his positional control lever sufficiently fast that the spool moves to open the port 66 to annulus 59 which is in communication with the return conduit 165 by way of the port 59a, the interior 52 of the spool 46, and the ports 69 and 67. As for the pitch-fining condition the valve 79 is thus caused to close the conduit 85 and the delivery from the pump 28 of higher flow capacity thus supplements delivery from the pump 27 for the required higher rate of pitch-change in the coarse pitch direction.

During such fine pitch and coarse pitch control under normal running operation the delivery from the feathering pump 148 is, as explained above, caused to flow through the condition control valve assembly 90 back to the reservoir 26.

However, if it is required to feather the blades 14 of the fan, the tube 104 is moved to the right in FIG. 2, whereupon, by way of the condition selection cam 106, the spool 93 of the assembly 90 is displaced downwardly. Hence the conduit 150 is placed in communication through the annulus 119, the annulus 129, the port 139, the annulus 103, the port 140, the annulus 130 and the annulus 120 with the conduits 161 and 157.

Such feathering operation would be initiated upon shut-down or failure of the engine when the fan 7, and thus the pumps 27 and 28, are running towards the stopped condition. Likewise the feathering pump 148 would also be running down towards its stopped condition when considering its drive by way of the mechanical means associated therewith. However, at this stage the feathering motor 149 is energised to drive the feathering pump 148 quite independently of rotor rotation so that pressure liquid delivered by the feathering pump into the conduit 150 passes across the condition control valve assembly into the conduit 157 and thus through the porting 158 to all the coarse pitch chambers of the actuator 20. Simultaneously, all the fine-pitch chambers of the actuator are placed in communication through the porting 160, the conduit 159, the annulus 114, the annulus 124, the port 134, the annulus 101, the port 135, the annulus 125, the annulus 115, the conduit 162, the conduit 163 and the non-return valve 164 with the reservoir 26. In this way the actuator is pressurised to move the blades 14 of the fan 7 through to the feathered condition, the liquid discharging from the fine pitch chambers of the actuator passing to the reservoir 26.

Upon reaching the feathered condition, electrical hub switches (not shown) are operative to isolate the feathering motor 149 and thereby stop the feathering pump 148.

When the pilot requires to unfeather the blades 14 of the fan 7 he moves his positional control lever in the fine pitch direction so that the spool 46 is lifted. He also moves his condition control lever such that the control tube 104 moves to the left in the drawing beyond the "normal-run" position. Hence the spool 93 of the condition control valve assembly is lifted and upon re-energising of the feathering motor 149 the feathering pump 148 is operated to draw liquid from the reservoir 26 and to deliver this through the conduit 150 and the conduit 151 into the annulus 117. Liquid under pressure thereafter passes through the annulus 127, the port 137, the annulus 102, the port 136, the annulus 126, the annulus 116, the conduit 167 and the conduit 41 to the annulus 42, the port 65 and thus into the annulus 61 of the spool 46.

Since the spool 46 is displaced upwardly away from its neutral position, the pressure fluid now available in the annulus 61 passes through the conduit 152, the appropriate ports and annuli in the valve assembly 90, the conduit 159 and the porting 160 to all the fine pitch chambers of the actuator 20. At the same time all the coarse pitch chambers of the actuator are placed in communication through the assembly 90 and the assembly 44 with the reservoir 26.

Simultaneously with such unfeathering operation, the gas turbine engine is started and when the pitch of the blades 14 reaches a sufficiently fine value, the motor 149 is de-energised. By this time the pumps 27, 28 and 148 are being driven upon rotation of the fan by virtue of their associated mechanical means connecting their rotary parts with fixed structure. With deenergisation of the motor 149, the tube 70 is moved so that the spool 46 of the assembly 44 is returned to its neutral position and also the tube 104 is moved so that the spool 93 of the assembly 90 is lowered to the "normal-run" position shown in FIG. 2.

The lowering movement of the spool 93 causes the delivery from the pump 148 to be directed back into the reservoir 26.

When for landing of the aircraft in which the engine and self-contained fan are installed, it is required to move the blades 14 into the negative pitch range, in order to effect aerodynamic braking of the aircraft, the pilot, with his engine throttle at the approach idling setting, moves his positional control lever in the pitch-fining direction and the condition control lever such that the tube 104 moves beyond the "unfeathering" position to the "stop withdrawal" position.

The pitch stop associated with actuator 20 but not shown in the drawings, is effective to prevent the blades from moving into the negative pitch range, but when upon touch-down of the aircraft it is required to so move the blades for the purpose of braking, this stop must be withdrawn by mechanism 171 to allow the actuator 20 to move sufficiently far that the blades reach the required negative pitch.

The required movement of the tube 104 causes the roller 141 to rise up the right-hand end portion of the cam 106, whereupon the valve 143 us lifted against the spring 145 away from its seating 146 while the upper portion of the valve element 143 engages the seating 147. The spool 93 of the assembly 90 is, for this operation, positioned as for the unfeathering operation, and thus the land 97 closes over the port 136 so that pressure liquid in the conduits 167 and 168 passes only into the conduit 169 by way of the chamber 170 of valve 144. Hence the mechanism 171 is operated to withdraw the pitch stop. Since the assembly 44 is selecting fine pitch, the actuator is now able to operate to move the blades 14 through the zero pitch position into the negative pitch range. Since such movement is required to be rapid, the pilot moves his lever rapidly and hence the valve 79 is automatically closed so that the deliveries from both pumps 27 and 28 pass into the actuator.

As the required negative pitch is reached the engine throttle is opened so that full engine power is transmitted to the fan, whereby a high degree of aerodynamic braking of the aircraft by the fan in negative pitch is obtained.

Return of the blades to the positive pitch range by pitch-coarsening with the pitch stop still withdrawn is subsequently effected. When the blades reach the positive pitch range, the cam 106 is caused to move the valve 143 back to its closed position against the seating 146, whereupon the conduit 169 is placed in communication with the return conduits 162 and 163 and the pitch stop is extended.

In the above-described system, by so providing the condition control valve assembly 90 with a sleeve 92, surrounding the spool 93, which is driven continuously upon rotation of the rotor, frictional effect upon movement of the spool linearly with respect to the sleeve is reduced to a very low order, with the result that there is little likelihood of the spool 93 sticking during its controlled movement and causing faulty operation of the system. This is also the case with the positional control valve assembly 44, where likewise the sleeve 45 is continuously rotated upon rotation of the rotor and where the spool 46 is linearly adjustable with respect to the sleeve.

Although in the above-described system the sleeves of the control valve assemblies are continuously rotatable, instead, in other embodiments of the invention, both of the spools of those assemblies are continuously rotatable.

Finally, by so providing a pump control valve which is liquid-pressure-operable upon appropriate displacement of the spool of the positional control valve assembly, there is no direct mechanical connection between the spool and the displaceable element of the pump control valve. Hence the degree of opening of that valve is in no way mechanically related to the degree of linear movement of said spool.

We claim:

1. A bladed rotor comprising a hub, blades carried by the hub and mounted for adjustment about their longitudinal axes, a liquid-pressure-operable actuator carried by the hub for adjusting the blades to vary flow of fluid over the blades, at least one pump associated with the rotor which is capable of supplying liquid under pressure to said actuator, control valve means, disposed between said pump and said actuator, which comprise a positional control valve assembly and a condition control valve assembly operable the one assembly in conjunction with the other and each carried by said hub so as to be rotatable bodily as one therewith, a first input linkage connected to said positional control valve assembly and a second input linkage connected to said condition control valve assembly, said positional control valve assembly and said condition control valve assembly each comprising two co-operable elements which are relatively adjustable by their respective input linkages for appropriate control of flow of pressure liquid discharged by said pump to said actuator, drive means provided upon one of said elements of at least said condition control valve assembly and mechanical means, including shafting and gearing, which are co-operable with said drive means and which are connected fast with non-rotative structure whereby said one of said elements is continuously rotated with respect to the other of said elements consequent upon rotation of said rotor.

2. A bladed rotor comprising a hub, blades carried by the hub and mounted for adjustment about their longitudinal axes, a liquid-pressure-operable actuator carried by the hub for adjusting the blades to vary flow of fluid over the blades, at least one pump associated with the rotor which is capable of supplying liquid under pressure to said actuator, control valve means, disposed between said pump and said actuator, which comprise a positional control valve assembly and a condition control valve assembly operable the one assembly in conjunction with the other and each carried by said hub so as to be rotatable bodily as one therewith, a first input linkage connected to said positional control valve assembly and a second input linkage connected to said condition control valve assembly, said positional control valve assembly and said condition control valve assembly each comprising two co-operable elements which are relatively adjustable by their respective input linkages for appropriate control of flow of pressure liquid discharged by said pump to said actuator, first drive gear means provided upon one of said elements of said positional control valve assembly and second drive gear means provided upon one of said elements of said condition control valve assembly, and mechanical means, including shafting and gearing, which are co-operable with said first drive gear means and with said second drive gear means and which are connected fast with non-rotative structure whereby each said one of said elements is continuously rotated with respect to the other element co-operable therewith consequent upon rotation of said rotor.

3. A rotor as claimed in claim 2, wherein the two elements of each said valve assembly comprise a spool and a sleeve.

4. A rotor as claimed in claim 3, wherein each sleeve forms the continuously rotatable element of its assembly.

5. A rotor as claimed in claim 4, wherein said hub carries said pump so that it is rotatable bodily therewith.

6. A rotor as claimed in claim 5, wherein said mechanical means also serve to connect a part of said pump with said non-rotative structure to afford operation of the pump upon rotation of the rotor.

7. A rotor as claimed in claim 5, wherein said positional control valve assembly and said condition control valve assembly are disposed radially of and within the hub.

8. A rotor as claimed in claim 4, wherein said respective input linkages include tubes axially-slidable with respect to said hub, said tubes having their axes coincident with the rotational axis of the rotor and being connected respectively to the spools of their associated assemblies so that axial adjustment of the tubes effects linear movement of the spools with respect to the sleeves.

9. A rotor as claimed in claim 8, wherein said tubes are connected to their spools by way of respective cam and roller mechanisms.

10. A rotor as claimed in claim 5, wherein said hub includes at least one further pump separate from said one pump and intended for feathering and unfeathering of the blades when the spool of the condition control valve assembly is displaced to appropriate positions.

11. A rotor as claimed in claim 10, wherein said pump draws its liquid for operation from an associated main reservoir contained within the hub, while said further pump draws its liquid for operation from an auxiliary reservoir which is separate from but adjacent to said main reservoir.

12. A rotor as claimed in claim 2 and having two pumps associated therewith, wherein a liquid-pressure-operable pump control valve is associated with one of those two pumps and adapted to direct supply from that pump to the actuator only when said positional control valve assembly is opened beyond a predetermined position.

13. A rotor as claimed in claim 12, wherein the other of said two pumps has low flow characteristics suitable for adjustment of the blades of the rotor at slow rates, and said one pump has high flow characteristics, the supply from said one pump when directed to the actuator supplementing the supply to the actuator from said other of said two pumps to afford adjustment of the blades at fast rates.

14. A bladed rotor comprising a hub, blades carried by the hub and mounted for adjustment about their longitudinal axes, a liquid-pressure-operable actuator associated with the hub for adjusting the blades to vary flow of fluid over the blades, at least one pump associated with the rotor which is capable of supplying liquid under pressure to said actuator, control valve means associated with the hub and disposed between said pump and said actuator, said control valve means comprising a positional control valve assembly and a condition control valve assembly operable the one assembly in conjunction with the other, said positional control valve assembly and said condition control valve assembly each comprising a first element and a second element disposed co-axially with respect to the first element, a first input linkage connected to said positional control valve assembly for relative adjustment of the elements thereof and a second input linkage connected to said condition control valve assembly for relative adjustment of the elements thereof, said relative adjustment of said elements affording appropriate control of flow of pressure liquid discharged by said pump to said actuator, drive means carried by one of said elements of at least said condition control valve assembly, and mechanical means in driving engagement with said drive means whereby upon rotation of the rotor said one element is continuously rotated with respect to the other element of that assembly about the common axis thereof.

15. A bladed rotor comprising a hub, blades carried by the hub and mounted for adjustment about their longitudinal axes, a liquid-pressure-operable actuator carried by the hub for adjusting the blades to vary flow of fluid over the blades, at least one pump associated with the rotor which is capable of supplying liquid under pressure to said actuator, control valve means, disposed between said pump and said actuator, which comprise a positional control valve assembly and a condition control valve assembly operable the one assembly in conjunction with the other and each carried by said hub so as to be rotatable bodily as one therewith, a first input linkage connected to said positional control valve assembly and a second input linkage connected to said condition control valve assembly, said positional control valve assembly and said condition control valve assembly each comprising a sleeve element and a spool element disposed co-axially within the sleeve element, each spool element being adjustable with respect to its sleeve element by its respective input linkage for appropriate control of flow of pressure liquid discharged by said pump to said actuator, drive gear means provided upon both said sleeve elements, and mechanical means, including shafting and gearing, one portion of said shafting being connected fast with non-rotative structure and other portions thereof having gear means in mesh with said drive gear means whereby said sleeve elements are continuously rotated with respect to their spool elements about the common axes thereof consequent upon rotation of said rotor.

* * * * *